United States Patent [19]

Moser

[11] Patent Number: 5,023,324

[45] Date of Patent: Jun. 11, 1991

[54] BISCATIONIC DISAZO AND TRISAZO COMPOUNDS HAVING OPTIONALLY FURTHER SUBSTITUTED 6-HYDROXY-4-METHY-3-N-PYRIDINIUM-PYRIDONE-2 COUPLING COMPONENT RADICALS, DYES COMPOSITIONS COMPRISING THEM AND THEIR USE

[75] Inventor: Helmut Moser, Oberwil, Switzerland

[73] Assignee: Sandoz Ltd., Basel, Switzerland

[21] Appl. No.: 891,723

[22] Filed: Jul. 29, 1986

Related U.S. Application Data

[60] Continuation of Ser. No. 164,098, Jun. 30, 1980, abandoned, which is a division of Ser. No. 809,284, Jun. 23, 1977, abandoned, which is a continuation-in-part of Ser. No. 700,933, Jun. 29, 1976, abandoned.

[30] Foreign Application Priority Data

| Jun. 30, 1975 | [CH] | Switzerland | 8466/75 |
| Nov. 5, 1975 | [CH] | Switzerland | 14261/75 |
| Aug. 4, 1976 | [CH] | Switzerland | 9942/76 |

[51] Int. Cl.$^5$ .......... C09B 44/02; C09B 44/08; D06P 1/41; D06P 1/08
[52] U.S. Cl. .......... 534/606; 8/919; 162/162; 534/604; 534/605; 534/607; 534/608; 534/771; 534/772; 534/773; 534/653
[58] Field of Search ........ 534/603, 604, 605, 606, 534/607, 653, 608, 771, 772, 773; 146/164; 8/919; 162/162

[56] References Cited

U.S. PATENT DOCUMENTS

| 3,501,453 | 3/1970 | Steinemann | 534/606 X |
| 3,518,247 | 6/1970 | Altermatt et al. | 534/606 X |
| 3,852,261 | 12/1974 | Steinemann | 534/606 X |
| 3,869,441 | 3/1975 | Hughes | 534/606 X |
| 3,956,265 | 5/1976 | Leng et al. | 534/606 X |
| 3,998,803 | 12/1976 | Burkhard et al. | 534/606 X |
| 4,087,244 | 5/1978 | Greve et al. | 54/606 X |
| 4,167,509 | 9/1979 | Parton | 534/606 X |

FOREIGN PATENT DOCUMENTS

| 843511 | 12/1976 | Belgium | 534/606 |
| 566845 | 12/1958 | Canada | 534/606 |
| 2190972 | 1/1974 | France | 534/606 |
| 1296857 | 11/1972 | United Kingdom | 534/606 |
| 1297116 | 11/1972 | United Kingdom | 534/606 |
| 1377612 | 12/1974 | United Kingdom | 534/606 |

*Primary Examiner*—Floyd D. Higel
*Attorney, Agent, or Firm*—Gerald D. Sharkin; Richard E. Vila; Melvyn M. Kassenoff

[57] ABSTRACT

Disazo and trisazo compounds free of sulfo groups which contain 6-hydroxy-4-methyl-3-N-pyridinium-pyridone-2 coupling component radicals, the preferred compounds being of the formula

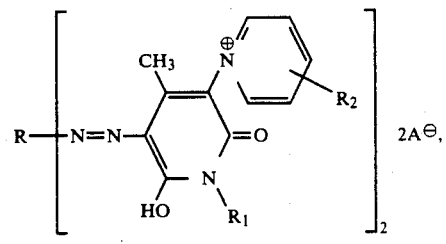

wherein
R is a tetrazo component radical,
each $R_1$ is independently hydrogen, $C_{1-4}$alkyl, $C_{2-4}$hydroxyalkyl the hydroxy group of which is in other than the 1-position or —$NR_3R_4$, wherein each of $R_3$ and $R_4$ is independently n-$C_{1-4}$alkyl,
each $R_2$ is independently hydrogen, n-$C_{1-4}$alkyl, n-$C_{1-4}$hydroxyalkyl or $C_{1-4}$alkoxy, and
each $A^\ominus$ is an anion, and liquid and granulated dye compositions comprising such compounds, are useful for dyeing paper and basically dyeable substrates such as polymers and copolymers of acrylonitrile and dicyanoethylene and synthetic polyesters and polyamides modified to contain acid groups. Dyeings on paper are brilliant and possess good light fastness and good fastness to water and alcohol.

56 Claims, No Drawings

BISCATIONIC DISAZO AND TRISAZO COMPOUNDS HAVING OPTIONALLY FURTHER SUBSTITUTED 6-HYDROXY-4-METHY-3-N-PYRIDINIUMPYRIDONE-2 COUPLING COMPONENT RADICALS, DYES COMPOSITIONS COMPRISING THEM AND THEIR USE

This application is a continuation of application Ser. No. 06/164,098, filed June 30, 1980, and now abandoned, which in turn is a division of application Ser. No. 05/809,284, filed June 23, 1977, and now abandoned, which in turn is a continuation-in-part of application Ser. No. 05/700,933, filed June 29, 1976, and now abandoned.

The invention relates to azo compounds.

The invention provides biscationic disazo and trisazo dye-stuffs which are free from sulphonic acid groups and which contain terminal coupling component radicals, said coupling component radical being 4-methyl-6-hydroxy-3-N-pyridinumpyridone radicals, coupled at the 5-position of the pyridone ring.

The dyestuffs provided by the invention may be symmetrical or asymmetrical. The pyridone nitrogen atom may, for example, be unsubstituted (i.e. attached to a hydrogen atom) or substituted by alkyl (which may in turn be substituted) or by a tertiary amino group. The pyridinium group may also be substituted, e.g. by alkyl or alkoxy (which in turn may be substituted). The nature of any substituent is not critical provided at its compatible with azo basic dyestuff chemistry and the use of the compounds as basic dyes. Suitable substituents will readily occur to those skilled in the art.

Where the pyridone nitrogen atom is substituted, the preferred substituents are straight or branched $C_{1-4}$alkyls, unsubstituted or substituted by a hydroxy group (the hydroxy group, of course, being at least two carbon atoms removed from the nitrogen atom), and radicals of the formula $-NR_3R_4$, where $R_3$ and $R_4$, independently, are each straight chain $C_{1-4}$alkyl radicals. Where the pyridinium radical is substituted, the preferred substituents are straight $C_{1-4}$alkyls, unsubstituted or substituted by a hydroxy radical, and $C_{1-4}$alkoxy radicals.

These preferred compounds may be represented by formula I,

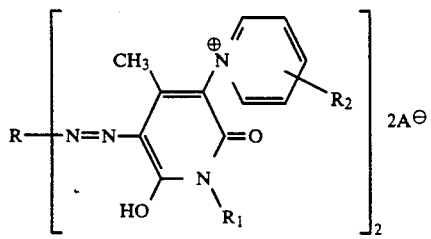

where
R is the radical of a tetrazotisable diamino compound,
$R_1$ is hydrogen, $C_{1-4}$alkyl, $C_{2-4}$hydroxyalkyl the hydroxy group of which is in other than the 1-position or $-NR_3R_4$, where $R_3$ and $R_4$, independently, are unsubstituted straight chain $C_{1-4}$alkyls, preferably both being methyl,
$R_2$ is hydrogen; straight chain $C_{1-4}$alkyl, unsubstituted or substituted by a hydroxy group; or $C_{1-4}$alkoxy, and
$A^{\ominus}$ is an anion.

As will be appreciated, in the trisazo compounds R contains an azo linkage whereas in the disazo compounds R is free from such linkage.

R preferably has a significance of R', i.e. 1,4-phenylene, 2,7-fluoroenylene,

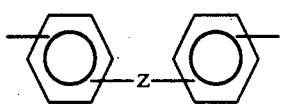

or

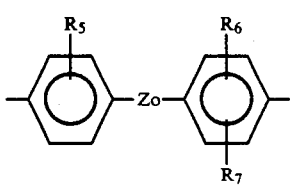

where
Z is bound meta or para to the free bonds and is a direct bond ($Z_1$), straight or branched $C_{1-6}$alkylene($Z_2$),
—CO—($Z_3$), —NHCSNH—($Z_4$), —S—($Z_5$),
—O—($Z_6$), —CH=CH—($Z_7$), —S—S—($Z_8$), —SO$_2$—($Z_9$), —NH—($Z_{10}$), —NH—CO—($Z_{11}$), —NCH$_3$—CO—($Z_{12}$),

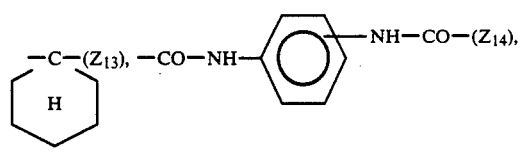

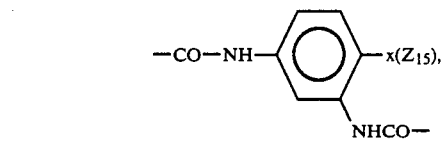

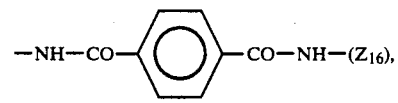

—SO$_2$NH—($Z_{17}$),

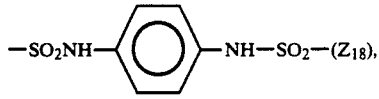

—NR$_8$—CO—(CH$_2$)$_n$—CO—NR$_8$—($Z_{19}$), —NR$_8$—CO—CH=CH—CO—NR$_8$—($Z_{20}$), —NR$_8$—CO—NR$_8$—($Z_{21}$), —CO—NH—NH—CO—($Z_{22}$), —CH$_2$—CO—NH—NH—CO—CH$_2$—($Z_{23}$), —CH=CH—CO—NH—NH—CO—CH=CH—($Z_{24}$),

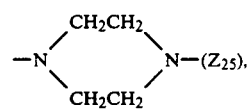

-continued $$-O-CO-N\begin{pmatrix}CH_2CH_2\\CH_2CH_2\end{pmatrix}N-CO-O-(Z_{26}),$$

$$-\underset{\underset{O}{\diagdown}}{\overset{N=N}{C}}\overset{\parallel}{-}C-(Z_{27}),$$

$-O-CO-O-(Z_{28})$, $-CO-O-(Z_{29})$, $-CO-CO-(Z_{30})$, $-O-(CH_2)_n-O-(Z_{31})$, $$-NR_8-\underset{\underset{\underset{y}{C}}{N}}{\overset{N}{C}}\overset{N}{\underset{N}{=}}C-NR_8-(Z_{32}) \text{ or}$$

$$-O-\underset{\underset{\underset{y}{C}}{N}}{\overset{N}{C}}\overset{N}{\underset{N}{=}}C-O-(Z_{33}),$$

in which n is 1, 2, 3 or 4, preferably 2 or 4,
x is halogen, $C_{1-4}$alkyl or $C_{1-4}$alkoxy, and
y is halogen (preferably chlorine), $-NHCH_2CH_2OH$ or $-N(CH_2CH_2OH)_2$,
$Z_o$ is $Z_1$, above, $-N=N-(Z_{34})$, $-CH_2-(Z_{35})$ or $-CH_2CH_2-(Z_{36})$,
$R_5$ is hydrogen, halogen, $C_{1-4}$alkyl or $C_{1-4}$alkoxy,
$R_6$ is halogen, $C_{1-4}$alkyl or $C_{1-4}$alkoxy,
$R_7$ is hydrogen, $C_{1-4}$alkyl or $C_{1-4}$alkoxy, and
$R_8$ is, independently, hydrogen or $C_{1-4}$alkyl (preferably methyl).

Where $R_1$ is an unsubstituted alkyl radical, it is preferably methyl or ethyl, and when alkyl substituted by hydroxy, the alkyl radical is preferably of 2 or 3 carbon atoms and the hydroxy group preferably is in the $\beta$-position. The preferred significances of $R_1$ are those set out for $R_1'$, below, particularly those set out for $R_1''$.

Where $R_2$ is unsubstituted alkyl, it is preferably methyl, and when alkyl substituted by hydroxy then the alkyl is preferably of 2 carbon atoms, the hydroxy group being on the $\beta$-carbon atom. Where $R_2$ is alkoxy, it is preferably methoxy. The preferred significances of $R_2$ are those set out for $R_2'$, below, particularly those set out for $R_2''$.

By halogen, as used herein, is to be understood chlorine, bromine or fluorine, chlorine, however, being the preferred halogen.

As a first class of particularly preferred compounds may be given the compounds of formula Ia, $$\left[R''-N=N-\underset{\underset{HO}{\diagdown}}{\overset{CH_3}{C}}\overset{\oplus}{\underset{N}{\diagdown}}\overset{R_2'}{\diagdown}\right]_2 2A^\ominus \quad \text{Ia}$$

in which
$R_1'$ is hydrogen, methyl, ethyl, 2-hydroxyethyl, 2-hydroxypropyl, $-N(CH_3)_2$ or $-CH(CH_3)CH_2OH$, preferably hydrogen or methyl,
$R_2'$ is hydrogen, methyl, methoxy or 2-hydroxyethyl, preferably hydrogen or methyl, and
$R''$ is $$-\phenyl-Z'-\phenyl- \quad \text{(aa)}$$

$$-\phenyl-Z_{x'}-\phenyl- \quad \text{(ab)}$$

or $$-\underset{R_5'}{\phenyl}-Z_{o'}-\underset{R_5'}{\phenyl}- \quad \text{(ac)}$$

where $Z'$ is $Z_5$, $Z_6$, $Z_7$, $Z_{10}$, $Z_{11}$, $Z_{16}$, $Z_{17}$, $Z_{18}$, $Z_{22}$, $Z_{23}$, $Z_{24}$, $Z_{25}$, $Z_{26}$, $Z_{27}$, $Z_{28}$, $Z_{29}$, $Z_{30}$ or $Z_{36}$, as defined above, $-NH-CO-NH-(Z_{37})$, $$-CO-NH-\phenyl-NH-CO-(Z_{38}),$$

$$-CO-NH-\underset{NHCO-}{\phenyl}-x'(Z_{39}),$$

$-NH-CO-CH_2CH_2-CO-NH-(Z_{40})$, $-NH-CO-CH=CH-CO-NH-(Z_{41})$, $-NH-CO-(CH_2)_4-CO-NH-(Z_{42})$, $-NCH_3CO-CH_2CH_2-CO-NCH_3-(Z_{43})$, $-NCH_3-CO-CH=CH-CO-NCH_3-(Z_{44})$, $-NCH_3-CO-NCH_3-(Z_{45})$, $-O-CH_2CH_2-O-(Z_{46})$,

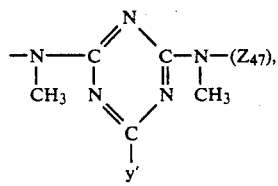

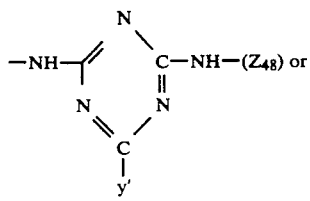

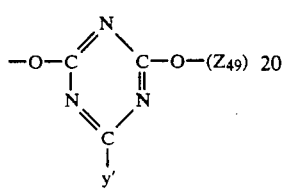

in which x' is hydrogen, chlorine, methyl or methoxy, and
Y' is chlorine, —NH—CH$_2$CH$_2$OH or —N(CH$_2$C-H$_2$OH)$_2$,
Zx' is Z$_{11}$, Z$_{16}$, Z$_{40}$ or Z$_{41}$, as defined above,
Zo' is Z$_1$, Z$_{35}$ or Z$_{36}$, as defined above, and the R$_5$''s are the same and are chlorine, methyl or methoxy,
R'' preferably signifying a radical (aa), where Z' is Z$_{11}$, Z$_{16}$, Z$_{23}$, Z$_{26}$, Z$_{27}$, Z$_{36}$, Z$_{38}$, Z$_{40}$, Z$_{41}$, Z$_{42}$, Z$_{43}$, Z$_{44}$ or Z$_{47}$, preferably Z$_{11}$, Z$_{16}$, Z$_{26}$, Z$_{27}$, Z$_{36}$ or Z$_{38}$.

Of the compounds of formula Ia, the compounds of formula Ia' are preferred,

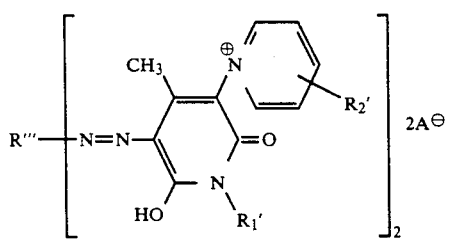

wherein

R$_2$' and R$_1$' and the preferred significances thereof are as defined above, and
R''' is a radical

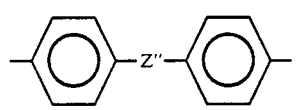

where Z'' is Z$_{11}$, Z$_{16}$, Z$_{23}$, Z$_{26}$, Z$_{27}$, Z$_{36}$, Z$_{38}$, Z$_{40}$, Z$_{41}$, Z$_{42}$, Z$_{43}$, Z$_{44}$ or Z$_{47}$, preferably Z$_{11}$, Z$_{16}$, Z$_{26}$, Z$_{27}$, Z$_{36}$ or Z$_{38}$, particularly preferred being the compounds of formula Ia'',

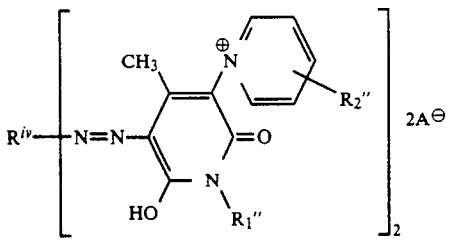

wherein

R$_1$'' and R$_2$'', independently, are hydrogen or methyl, and
R$^{iv}$ is a radical

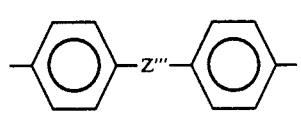

in which Z''' is Z$_{11}$, Z$_{16}$, Z$_{26}$, Z$_{27}$, Z$_{36}$ or Z$_{38}$, as defined above.

The preferred compounds of formulae I, Ia, Ia' and Ia'' are those that are symmetrical, i.e., those wherein the R$_1$'s (or R$_1$''s or R$_1$'''s) are identical and the R$_2$'s (or R$_2$''s or R$_2$'''s) are identical and are in the identical positions of the pyridinium rings. As a second class of particularly preferred compounds may be given the compounds of formula Ib,

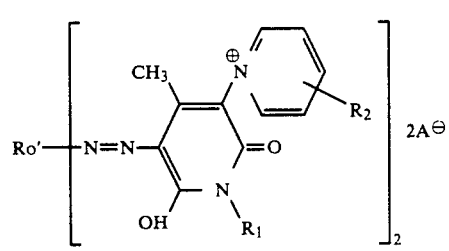

wherein

R$_1$ and R$_2$ are as defined above, their significances preferably being those of R$_1$' and R$_2$', respectively, and more preferably being those of R$_1$'' and R$_2$'', respectively, and
Ro' is a radical

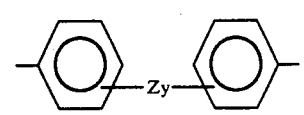

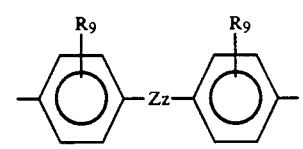

where

Zy is Z$_{11}$ or Z$_{14}$, as defined above,
Zz is Z$_1$, Z$_{35}$ or Z$_{36}$, as defined above, and
the R$_9$'s are the same and are hydrogen, chlorine or methyl.

In the compounds of formula Ib, Ro' preferably has the significance Ro", i.e.

(R50) 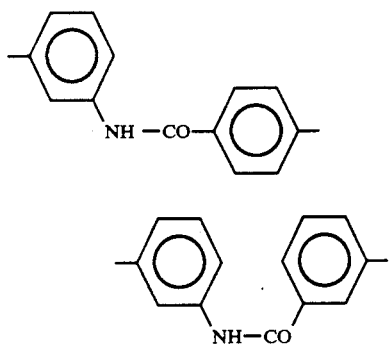

(R51)

(R52) 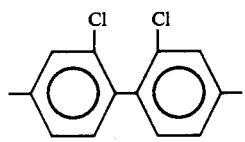

(R53) 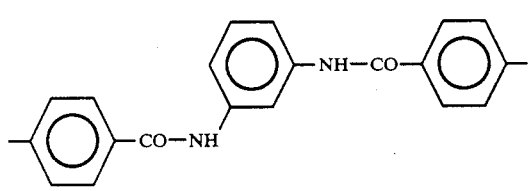

(R54) 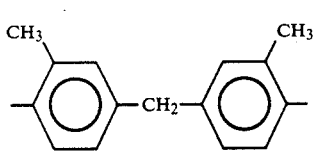

(R55) 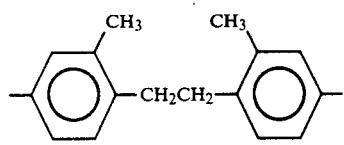

(R56) 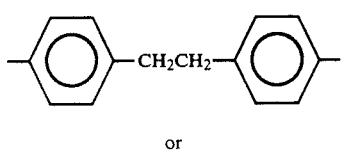

or (R57) 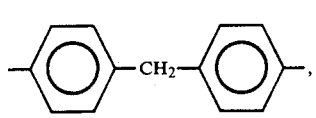

more preferably the significance Ro''', i.e. $R_{52}$, $R_{54}$, $R_{55}$, $R_{56}$ or $R_{57}$, as defined above, and is most preferably $R_{55}$, $R_{56}$ or $R_{57}$.

Thus, as the preferred compounds of formula Ib may be given the compounds of formula Ib',

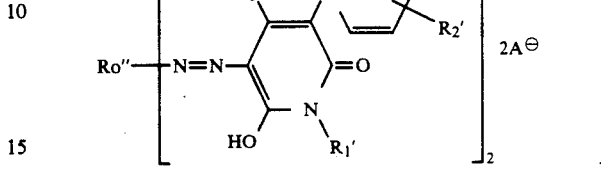

in which
$R_1'$ and $R_2'$ and the preferred significances thereof are as defined above, and
Ro" is as defined above, it preferably being Ro''' and more preferably being $R_{55}$, $R_{56}$ or $R_{57}$, as defined above, and as the most preferred compounds of formula Ib may be given the compounds of formula Ib",

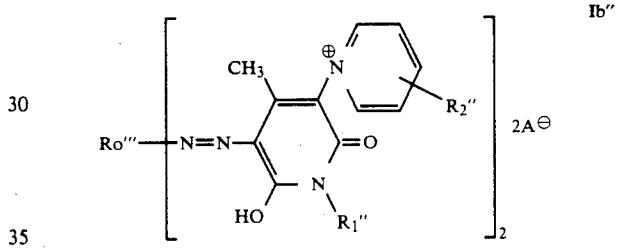

in which
$R_1''$ and $R_2''$ are as defined above, and
R''' is as defined above, preferably being $R_{55}$, $R_{56}$ or $R_{57}$.

As a further class of compounds provided by the invention may be given the compounds of formula Q

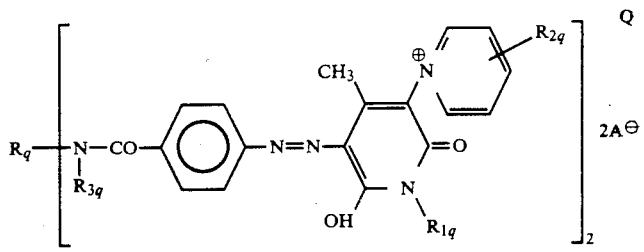

where
Rq is a straight chain $C_{2-4}$alkylene radical, preferably 1,2-ethylene,
each $R_{1q}$, independently, is hydrogen, $C_{1-4}$alkyl, $C_{2-4}$hydroxyalkyl the hydroxy group of which is in other than the 1-position or $-NR_{4q}R_{5q}$, where $R_{4q}$ and $R_{5q}$, independently, are unsubstituted, straight chain $C_{1-4}$alkyls,
each $R_{2q}$, independently, is hydrogen, straight chain $C_{1-4}$alkyl, unsubstituted or monosubstituted by hydroxy; or $C_{1-4}$alkoxy,
each $R_{3q}$, independently, is hydrogen or unsubstituted $C_{1-4}$alkyl, and
$A^{\ominus}$ is as defined above.

In the compounds of formula Q, any unsubstituted alkyl as $R_{1q}$ is preferably methyl or ethyl, more preferably methyl. Any hydroxy substituted alkyl as $R_{1q}$ is preferably 2-hydroxyethyl, 2-hydroxypropyl or

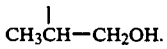

Any $-NR_{4q}R_{5q}$ group is preferably $-N(CH_3)_2$.

Any unsubstituted alkyl as $R_{2q}$ is preferably methyl, any hydroxyalkyl is preferably 2-hydroxyethyl and any alkoxy is preferably methoxy.

Any unsubstituted alkyl as $R_{3q}$ is preferably methyl or ethyl.

In the compounds of formula Q, $R_{1q}$ is preferably $R_{1q}'$, i.e. hydrogen, methyl, ethyl, 2-hydroxyethyl, 2-hydroxypropyl, $-N(CH_3)_2$ or

more preferably $R_{1q}''$, i.e. hydrogen or methyl, most preferably hydrogen, $R_{2q}$ is preferably $R_{2q}'$, i.e. hydrogen, methyl, methoxy or 2-hydroxyethyl, more preferably $R_{2q}''$, i.e. hydrogen or methyl, most preferably hydrogen. $R_{3q}$ is preferably $R_{3q}'$, i.e. hydrogen, methyl or ethyl, most preferably hydrogen.

The symmetrical compounds of formula Q are preferred.

The most preferred compounds of formula Q are those wherein each $R_{1q}$ and $R_{2q}$ is hydrogen and each $R_{3q}$ is hydrogen, methyl or ethyl, the two $R_{3q}$'s being identical, especially those wherein each $R_{1q}$, $R_{2q}$ and $R_{3q}$ is hydrogen.

The exact nature of the anion $A^\ominus$ is not particularly critical, any conventional anion in the basic dyestuffs art being suitable. It is preferably non-chromophoric and may be organic or inorganic. As examples may be given the halides, e.g. chloride or bromide, sulphate, bisulphate, methylsulphate, aminosulphate, perchlorate, propionate, lactate, succinate, benzenesulphonate, oxalate, maleinate, acetate, tartrate, malate, methanesulphonate, tetrafluoroborate, benzoate, complex ions of zinc chloride double salts, and the anions of boric, citric, glycolic, diglycolic and adipic acids.

The invention also provides a process for the production of the compounds of the invention, which process comprises coupling a tetrazo derivative of a diamine, optionally containing an azo linkage, with a 4-methyl-6-hydroxy-3-N-pyridinumpyridone-2, preferably in a mole ratio of 1:2.

The compounds of formula I may thus be obtained by reacting a tetrazo derivative of a diamine of formula II, $$H_2N-R-NH_2 \quad\quad II$$

with a compound of formula III,

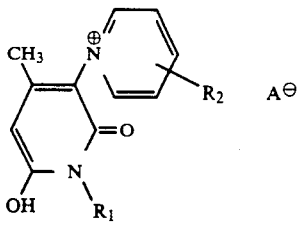

preferably at a mol ratio of 1:2.

The diazotisation and coupling may be carried out in conventional manner, coupling taking place suitably in aqueous (acidic, neutral or alkaline) or aqueous/organic medium, at a temperature of from $-10°$ C. to room temperature, optionally in the presence of a coupling accelerator such as pyridine or urea.

Mixtures of compounds of the invention may be obtained by employing the tetrazo derivative of a mixture of diamines and/or a mixture of the pyridones.

The starting materials for the production of the compounds of the invention are either known or may be obtained from available starting materials in analogous way to the known compounds.

The anion $A^\ominus$ desired in the final product may be introduced by incorporation in the pyridone starting material or, if desired, having obtained a compound of the invention having a particular anion $A^\ominus$, this anion may be exchanged for the desired anion in conventional manner, e.g. using an ion exchanger or by reaction with suitable salts, optionally in several stages, e.g. through the hydroxide or bicarbonate.

The dyes provided by the invention may be employed for dyeing basically dyeable substrates and paper.

If desired, the compounds may be converted into dyeing preparations. The processing into stable, liquid dyeing preparations may take place in a generally known manner, advantageously by dissolving them in suitable solvents, optionally adding an aid, e.g., a stabilizer; for example in accordance with the description given in French Patent No. 1,572,030.

Suitable liquid preparations are obtained, for example, by dissolving 1 part of 100% dyestuff in the form of the dyestuff base in 1 to 6 parts of an organic carboxylic acid or in a mixture of organic carboxylic acids and in 1 to 4 parts of water, but especially by dissolving 1 part of dyestuff in 1.5 to 4 parts of an organic carboxylic acid and in 1.5 to 4 parts of water.

The organic carboxylic acids are understood to be monobasic, dibasic or tribasic, but advantageously monobasic, low molecular weight carboxylic acids, such as formic acid, acetic acid and propionic acid.

EXAMPLE A OF A LIQUID PREPARATION 160 parts of the dyestuff from Example 1, below, as the dyestuff base are dissolved at 40°-60° C. in 300 parts of acetic acid and 320 parts of water. A stable, clear solution is obtained.

The processing into solid, granulated dye preparations may also take place in a generally known manner, advantageously by granulating in accordance with French Patent No. 1,581,900.

A granulate preparation contains, for example, 1 part of 100% dyestuff, 0.1 to 0.7 parts of an organic carboxylic acid and 0 to 1.5 parts of a solid, non-ionic diluting or standardising agent, preferably 1 part of dyestuff, 0.25 to 0.65 parts of an organic carboxylic acid and 0 to 1.5 parts of diluting or standardising agent.

The organic carboxylic acids for the production of the granulate may be monobasic, dibasic or tribasic, but advantageously are monobasic or dibasic, low molecular weight, saturated or unsaturated carboxylic acids, optionally containing hydroxyl groups, such as formic acid, acetic acid, propionic acid, oxalic acid, succinic acid, malonic acid, fumaric acid, lactic acid, malic acid, citric acid, etc.

The solid, non-ionic diluting or standardising agent may be, for example, dextrin or a sugar such as glucose, fructose or galactose, etc.

The granulates are advantageously prepared by comminution from solutions or suspensions, e.g. of the following composition:
1 part of dyestuff 100%,
0.1 to 0.7 parts of the organic carboxylic acid,
0 to 1.5 parts of the non-ionic diluting or standardising agent, and
1.5 to 6 parts of water,
or preferably
1 part of dyestuff 100%,
0.5 to 0.65 parts of the organic carboxylic acid,
0 to 1.5 parts of the diluting or standardising agent, and
2 to 4 parts of water.

EXAMPLE B OF A GRANULATE 160 parts of the dyestuff from Example 1, below, as a dyestuff base and 80 parts of dextrin are dissolved at 40°-60° C. in 47 parts of lactic acid and 320 parts of water, and the mixture is granulated by known methods.

The new dyestuffs are especially suitable for dyeing paper, e.g. for the production of dyed, sized and unsized paper in the stock. However, they may be used similarly for dyeing sheet paper by the steeping method. Conventional techniques may be used.

The new dyestuffs have good solubility properties, and they are particularly soluble in cold water. Furthermore, in the production of dyed paper, they colour the waste water slightly, if at all. They show low mottling on paper and to a great extent are insensitive to pH. The dyeings on paper are brilliant and have good light fastness properties. After lengthy exposure to light, the shade changes tone-in-tone. The dyed papers are fast to the wet, not only to water but also to milk, fruit juices and sweetened mineral water, and because of their good fastness to alcohol, they are also resistant to alcoholic drinks. The dyestuffs have a high degree of substantivity, i.e. they are absorbed quantitatively in practice; they may be added to the paper pulp directly, i.e. without previous dissolving, as a dry powder or as a granulate, without reducing the brilliance or the yield of colour. The dyed papers are bleachable both by oxidation and by reduction. The dyestuffs of formulae Ia, Ia', Ia" and Q are especially suitable for dyeing paper.

However, the dyestuffs are also suitable for dyeing, pad-dyeing and printing textile material consisting of acrylonitrile or dicyanoethylene polymers or mixed polymers, or synthetic polyesters which are modified by acid groups, but especially synthetic polyamides which are modified by acid groups, these including in particular the so-called "differential dyeing polyamide", or mixtures of textile material which consists of a predominant portion of the above-mentioned textile materials or contain these. For these dyeings, the dyestuffs of formulae Ib', Ib', Ib" and Q are especially suitable.

The acrylonitrile mixed polymers which are dyed or printed are advantageously copolymers consisting of 80–95% acrylonitrile and 20–5% vinyl acetate, vinyl pyridine, vinyl chloride, vinylidene chloride, acrylic acid, acrylic acid ester, methacrylic acid, methacrylic acid ester or asymmetrical dicyanoethylene.

The polyester material which is dyed or printed is advantageously of the type described in U.S. Pat. No. 3,379,723, e.g. synthetic polyester as obtained by polycondensation of aliphatic or aromatic dicarboxylic acids or their polyester-forming derivatives
a) with aliphatic or alicyclic diols
b) and optionally aromatic dihydroxy compounds
c) and/or their glycol ethers,
with compounds bearing anionic groups.

Polyester material which is modified by anionic groups may also be equally well dyed or printed, e.g. as described in U.S. Pat. No. 3,018,272, in British Patent No. 1,406,387, and in Japanese Published Specification No. 10,497/59.

The polyamide material which is modified by anionic groups is advantageously of the type described in Belgian Patent Nos. 549,179 and 706,104, U.S. Pat. Nos. 2,893,816 and 3,890,257 and "Textilveredlung 2" (1967), 11, pages 856-864, so-called Nylon-Dye-Resist types, in "Textilpraxis" 1967, volume 2 (February) pages 737-740, in "Du Pont Preliminary Information" of July 14, 1966 relating to "Type 844 Du Pont BCF Nylon", and Sept. 19, 1966 (Cationic Dyeable Nylon Staple).

Textile material consisting of polyacrylonitrile or polyester or polyamide which is modified by anionic groups may be dyed as described in German Published Specification No. 2,509,095, e.g. by the exhaust method in an aqueous medium, at temperatures of 60°-100° C. or at temperatures above 100° under pressure, whereby the pH may vary within a wide range.

Dyeing or printing may also take place in the presence of usual dyeing aids, e.g. in the presence of condensation products of naphthalene sulphonic acids and formaldehyde, or reaction products of castor oil and ethylene oxide, etc. Printing of the said textile materials takes place by impregnation with a printing paste which contains the dyestuff, water, an organic acid, e.g. acetic acid or formic acid, and a thickener, with subsequent fixation onto the fibres.

The printing paste is applied by stencils or rollers, the print is optionally intermediately dried and the dyestuff is fixed, e.g. by steam-treatment at temperatures of about 100° C., and the print is completed.

Fixation of the dyestuff may also take place by the pad-steam process or thermosol process, or by the pad-roll process; temperatures above 200° C. should, however, be avoided.

The dyestuffs are also suitable for dyeing the said textile materials in the stock, e.g. for gel dyeing by the so-called neocron process, for example in accordance with U.K. Patent No. 673,738.

Fast, even dyeings with good fastness properties, for example to light, are obtained on the above-mentioned substrates.

The following examples, in which the parts and percentages are by weight and the temperatures are in degrees centigrade, illustrate the invention.

EXAMPLE 1

10.6 parts of 4,4'-diaminodibenzyl are dissolved at 0° in 100 parts of water and 31 parts of 30% hydrochloric acid, and they are tetrazotised by known methods with 6.9 parts of sodium nitrite. Subsequently, a solution consisting of 25 parts of 3-pyridinium-4-methyl-6-hydroxypyridone-2-chloride and 100 parts of water is added in drops to the ice-cold diazo solution, and at the same time 15 parts of crystalline sodium acetate are sprinkled in in portions. After coupling, the reaction mixture is treated with hydrochloric acid, whereby the dyestuff is precipitated. The dyestuff is filtered off. When dried and ground, a hydro-soluble powder is obtained, which dyes paper in yellow shades. The dyestuff corresponds to the formula

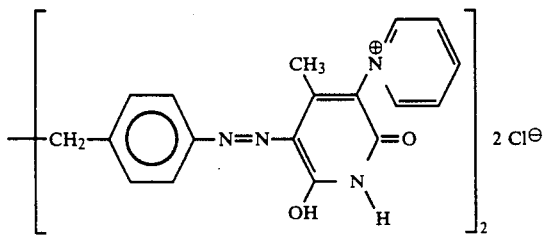

Dyeing Example A 70 parts of chemically bleached sulphite cellulose (from conifer wood) and 30 parts of chemically bleached sulphite cellulose (from birchwood) are ground in 2000 parts of water in a Hollander. 0.2 parts of the dyestuff described in Example 1 are sprinkled into this pulp. After mixing for 20 minutes, paper is produced from this pulp. The absorbent paper obtained in this way is dyed yellow. The waste water is practically colourless.

Dyeing Example B 0.5 parts of the dyestuff from Example 1 are dissolved in 100 parts of hot water and cooled to room temperature. This solution is added to 100 parts of chemically bleached sulphite cellulose which has been ground with 2000 parts of water in a Hollander. After mixing thoroughly for 15 minutes, sizing takes place. Paper produced from this pulp has a yellow shade of average intensity and has good wet fastness properties.

Dyeing Example C

An absorbent strip of unsized paper is drawn through a dyestuff solution of the following composition at 40°–50°:
0.5 parts of the dyestuff of Example 1
0.5 parts of starch and
99.0 parts of water.
The excess dyestuff solution is pressed out through two rollers. The dried strip of paper is dyed yellow. Equally good paper dyeings are obtained if equivalent amounts according to example a (liquid preparation) or example b (granulate preparation) are added to the above Dyeing Examples A, B and C.

EXAMPLE 2

20 parts of the dyestuff of the formula

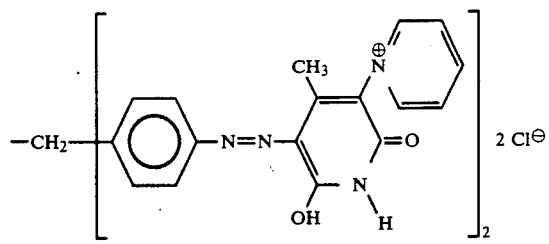

and 80 parts of dextrin are ground for 4 hours in a powder mill. The same dyestuff mixture may be obtained by making a paste with 100 parts of water, with subsequent spray-drying.

1 part of the preparation thus obtained is made into a paste with 1 part of 40% acetic acid, the paste is covered with 200 parts of demineralised water and boiled for a short time. It is diluted with 7000 parts of demineralised water, then 2 parts of glacial acetic acid are added and it is entered into the bath at 60° with 100 parts of polyacrylonitrile fabric. The material may previously be pretreated for 10–15 minutes at 60° in a bath consisting of 8000 parts of water and 2 parts of glacial acetic acid.

It is heated over the course of 30 minutes to 98°–100° C., boiled for 1½ hours and rinsed. A yellow dyeing with good light fastness and good wet fastness properties is obtained. The dyestuff may be obtained similarly to Example 1 by using an equivalent amount of 4,4'-diaminodiphenylmethane instead of 4,4'-diaminodibenzyl.

EXAMPLE 3

20 parts of the dyestuff given in Example 2 are mixed with 80 parts of dextrin in a ball mill for 48 hours.

1 part of the preparation thus obtained is made into a paste with 1 part of 40% acetic acid, the paste is covered with 200 parts of demineralised water and boiled for a short time. Dyeing takes place as follows using this stock solution:

a) It is diluted with 7000 parts of demineralised water, then 21 parts of calcined sodium sulphate are added, as well as 14 parts of ammonium sulphate, 14 parts of formic acid and 15 parts of a carrier based on the reaction products of ethylene oxide with dichlorophenols, and it is entered into the bath at 60° with 100 parts of polyester fabric which is modified by acid groups. The material may previously be pretreated for 10–15 minutes at 60° in a bath consisting of 8000 parts of water and 2 parts of glacial acetic acid.

It is heated over the course of 30 minutes to 98°–100°, boiled for one hour and rinsed. An even, yellow dyeing is obtained, with good fastness properties, for example to light and to the wet.

b) It is diluted with 3000 parts of demineralised water, then 18 parts of calcined sodium sulphate are added, as well as 6 parts each of ammonium sulphate and formic acid, and it is entered into the bath at 60° with 100 parts of polyester fabric which is modified by acid groups. It is heated in a closed container over the course of 45 minutes to 110°, kept at this temperature with shaking for 1 hour, then cooled over the course of 25 minutes to 60°, and the dyed matter is rinsed. An even, fast, yellow dyeing with good wet fastness properties is obtained.

EXAMPLE 4

20 parts of the dyestuff of Example 2 are mixed with 80 parts of dextrin in a ball mill for 48 hours. 1 part of the preparation thus obtained is made into a paste with 1 part of 40% acetic acid, the paste is covered with 200 parts of demineralised water and boiled for a short time. This solution is added to the dye liquor which is prepared as follows:

The solution is diluted with 7000 parts of demineralised water, then 21 parts of calcined sodium sulphate are added, as well as 14 parts of ammonium sulphate, 14 parts of formic acid and 15 parts of a carrier based on the reaction products of ethylene oxide with dichlorophenols, and the liquor is buffered with an acid buffering solution to a pH of 6, and then entered at 25° into the bath with 100 parts of polyamide fabric which is modified by anionic groups, the bath having a liquor ratio of 1:80. The bath is heated over the course of 45 minutes to 98° and boiled for one hour and the polyamide fabric is first rinsed in running water at 70°–80° and then in cold water. In order to be dried, the fabric may be centrifuged and subsequently ironed. A yellow dyeing with good fastness properties is obtained.

EXAMPLE 5

A printing paste is prepared as follows:

1 part of the dyestuff of Example 2 is made into a paste with 30 parts of acetic acid, and is covered with 280 parts of boiling water. 50 parts of benzyl alcohol are added to the solution obtained, as well as 500 parts of a thickener based on carboxymethyl cellulose which has been soaked in water in a ratio of 1:4, and 10 parts of a swelling agent.

A polyacrylonitrile fabric or a polyester or polyamide fabric which is modified by acid groups is printed in known manner with this printing paste. The prints are dried and steamed in an autoclave at 110° for 30 minutes at 1.8 atmospheres; the steam-treatment may also take place continuously for 5 to 30 minutes. After rinsing with cold water, any dyestuff which has not been fixed is removed by washing for 5 minutes at 70° with a 0.1% soap solution; it is subsequently rinsed again with cold water and the print is dried in known manner. A fast, even, yellow print with good fastness properties is obtained.

So-called "differential dyeing polyamide" material of the types 844, 846 or 847 of Du Pont are advantageously dyed in accordance with Example 4.

In table I is given the structure of further dyestuffs which may be produced in accordance with the description given in Example 1. They correspond to the formula

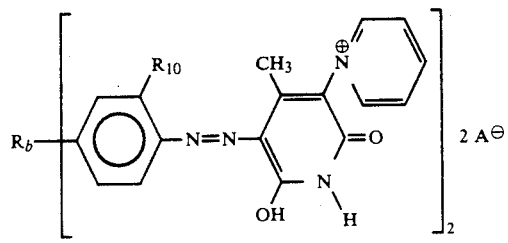

wherein $R_b$ and $R_{10}$ are as given in the table.

The anion $A^{\ominus}$ may be any of those listed in the description.

TABLE I

| Ex. No. | $R_b$ | $R_{10}$ |
|---|---|---|
| 6 | —NH—CO—NH— | H |
| 7 | —NH—CO— | H |
| 8 | —NH— | H |
| 9 | —CH$_2$— | —CH$_3$ |
| 10 | —C$_6$H$_{10}$— (cyclohexylene) | H |
| 11 | —S— | H |
| 12 | direct bond | H |
| 13 | " | OCH$_3$ |
| 14 | —CO—NH—C$_6$H$_4$—NH—CO— | H |
| 15 | —S—S— | H |
| 16 | —CH$_2$—CH$_2$— | OCH$_3$ |
| 17 | —CO— | H |
| 18 | —NH—CS—NH— | H |
| 19 | —O— | H |
| 20 | —CH=CH— | H |
| 21 | —SO$_2$— | H |
| 22 | —NH—C(=N)—N=C(—NH—)—N=C—N(CH$_2$—CH$_2$—OH)$_2$ (triazine) | H |
| 23 | —CH$_2$—CH$_2$— | Cl |
| 24 | —CH$_2$—CH$_2$— | CH$_3$ |
| 25 | —CH$_2$—CH$_2$— | OCH$_3$ |
| 26 | direct bond | Cl |
| 27 | —NH—CO—CH$_2$—CH$_2$—CO—NH— | H |
| 28 | —NH—CO—CH=CH—CO—NH— | H |
| 29 | —O—C(O)—N(CH$_2$CH$_2$)$_2$N—C(O)—O— (piperazine dicarbamate) | H |
| 30 | oxadiazole-diyl | H |
| 31 | —NH—CO—C$_6$H$_4$—CO—NH— | H |
| 32 | —SO$_2$—NH— | H |
| 33 | —SO$_2$—NH—C$_6$H$_4$—NH—SO$_2$— | H |
| 34 | —NH—CO—(CH$_2$)$_4$—CO—NH— | H |
| 35 | —N(CH$_3$)—CO—CH$_2$—CH$_2$—CO—N(CH$_3$)— | H |
| 36 | —N(CH$_3$)—CO—CH=CH—CO—N(CH$_3$)— | H |

TABLE I-continued

| Ex. No. | $R_b$ | $R_{10}$ |
|---|---|---|
| 37 | $-\overset{CH_3}{\underset{|}{N}}-\overset{O}{\underset{\|}{C}}-\overset{CH_3}{\underset{|}{N}}-$ | H |
| 38 | $-CO-NH-NH-CO-$ | H |
| 39 | $-CH_2-CO-NH-NH-CO-CH_2-$ | H |
| 40 | $-CH=CH-CO-NH-NH-CO-CH=CH-$ | H |
| 41 | $-N\begin{smallmatrix}CH_2-CH_2\\CH_2-CH_2\end{smallmatrix}N-$ | H |
| 42 | triazine with $-N(CH_3)-C$, $-N(CH_3)-C$, and $C-HNCH_2-CH_2-OH$ | H |
| 43 | triazine $-NH-C$, $-NH-C$, $C-Cl$ | H |
| 44 | triazine $-O-C$, $-O-C$, $C-Cl$ | H |
| 45 | triazine $-O-C$, $-O-C$, $C-N(CH_2-CH_2OH)_2$ | H |
| 46 | $-O-CO-O-$ | H |
| 47 | $-CO-O-$ | H |
| 48 | $-O-CH_2-CH_2-O-$ | H |

In table II is given the structure of further dyestuffs which may be produced in accordance with the description in Example 1. They correspond to the formula

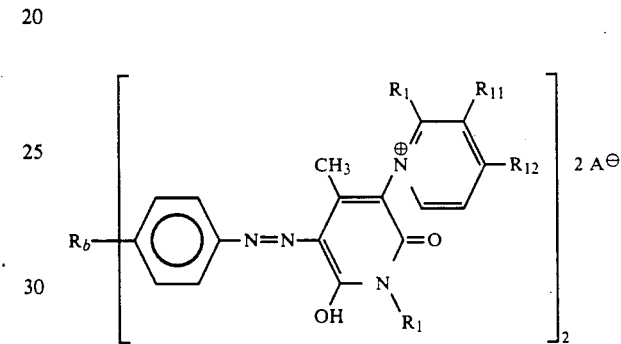

wherein $R_b$, $R_1$, $R_2$, $R_{11}$ and $R_{12}$ are as given in the table.

The anion $A^\ominus$ may be any of those listed in the description.

TABLE II

| Ex. No. | $R_b$ | $R_1$ | $R_2$ | $R_{11}$ | $R_{12}$ |
|---|---|---|---|---|---|
| 49 | $-CH_2-CH_2-$ | H | $-CH_3$ | H | H |
| 50 | " | H | H | $-CH_3$ | H |
| 51 | " | H | H | $-C_2H_4-OH$ | H |
| 52 | " | H | $-C_2H_4-OH$ | H | H |
| 53 | " | H | $-OCH_3$ | H | H |
| 54 | " | H | H | H | $-CH_3$ |
| 55 | " | $-CH_3$ | H | H | H |
| 56 | " | $-N(CH_3)_2$ | H | H | H |
| 57 | " | $-C_2H_4-OH$ | H | H | H |
| 58 | " | $-CH_2-CHOH-CH_3$ | H | H | H |
| 59 | " | $-CH\begin{smallmatrix}CH_3\\CH_2OH\end{smallmatrix}$ | H | H | H |
| 60 | $-NH-CO-$ | H | $-CH_3$ | H | H |
| 61 | " | H | H | $-CH_3$ | H |
| 62 | " | H | H | $-C_2H_4OH$ | H |
| 63 | " | H | $-C_2H_4-OH$ | H | H |
| 64 | " | H | $-OCH_3$ | H | H |
| 65 | " | H | H | H | $-CH_3$ |
| 66 | " | $-CH_3$ | H | H | H |
| 67 | " | $-N(CH_3)_2$ | H | H | H |
| 68 | " | $-C_2H_4-OH$ | H | H | H |
| 69 | " | $-CH_2-CHOH-CH_3$ | H | H | H |
| 70 | " | $-CH\begin{smallmatrix}CH_3\\CH_2-OH\end{smallmatrix}$ | H | H | H |

TABLE II-continued

| Ex. No. | $R_b$ | $R_1$ | $R_2$ | $R_{11}$ | $R_{12}$ |
|---|---|---|---|---|---|
| 71 | $-NH-CO-CH_2-CH_2-CO-NH-$ | $-CH_3$ | H | H | H |
| 72 | " | $-C_2H_4OH$ | $-CH_3$ | H | H |
| 73 | " | $-CH(CH_3)CH_2OH$ | H | H | H |
| 74 | " | $-CH_3$ | H | $CH_3$ | H |
| 75 | direct bond | H | $CH_3$ | H | H |
| 76 | $-NH-CO-CH=CH-CO-NH-$ | $CH_3$ | $CH_3$ | H | H |
| 77 | $-O-CO-N(CH_2CH_2)_2N-CO-O-$ (piperazine dicarbamate) | H | $CH_3$ | H | H |
| 78 | 1,3,4-oxadiazole-2,5-diyl | H | $CH_3$ | H | H |
| 79 | $-NH-CO-C_6H_4-CO-NH-$ (para) | $CH_3$ | $CH_3$ | H | H |
| 80 | $-SO_2-NH-$ | H | H | $CH_3$ | H |
| 81 | $-SO_2-NH-C_6H_4-NH-SO_2-$ | H | H | H | $CH_3$ |
| 82 | $-NH-CO-(CH_2)_4-CO-NH-$ | H | H | $CH_3$ | H |
| 83 | $-N(CH_3)-CO-CH_2-CH_2-CO-N(CH_3)-$ | $CH_3$ | $CH_3$ | H | H |
| 84 | $-N(CH_3)-CO-CH=CH-CO-N(CH_3)-$ | $-C_2H_4OH$ | $CH_3$ | H | H |
| 85 | $-N(CH_3)-CO-N(CH_3)-$ | $-N(CH_3)_2$ | $CH_3$ | H | H |
| 86 | $-CO-NH-NH-CO-$ | H | $CH_3$ | H | H |
| 87 | $-CH_2-CO-NH-NH-CO-CH_2-$ | H | $CH_3$ | H | H |
| 88 | $-CH=CH-CO-NH-NH-CO-CH=CH-$ | H | H | $CH_3$ | H |
| 89 | piperazine-1,4-diyl ($-N(CH_2CH_2)_2N-$) | $-CH_2-CHOH-CH_3$ | $CH_3$ | H | H |
| 90 | $-O-CO-O-$ | H | $CH_3$ | H | H |
| 91 | $-CO-O-$ | H | $CH_3$ | H | H |
| 92 | $-CO-CO-$ | H | $CH_3$ | H | H |
| 93 | $-O-CH_2-CH_2-O-$ | H | $CH_3$ | H | H |
| 94 | triazine: $-N(CH_3)-C=N-C(N(CH_2CH_2-OH)_2)=N-C=N-N(CH_3)-$ | H | $CH_3$ | H | H |

TABLE II-continued
| Ex. No. | $R_b$ | $R_1$ | $R_2$ | $R_{11}$ | $R_{12}$ |
|---|---|---|---|---|---|
| 95 | 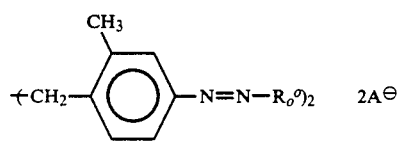 | H | CH$_3$ | H | H |
The dyestuffs listed in the following may be produced in accordance with Example 1 and correspond to the formulae
EXAMPLE 96
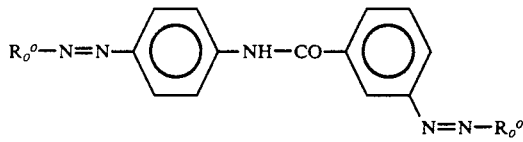
EXAMPLE 97
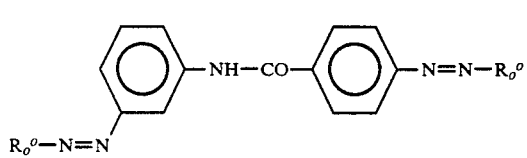
EXAMPLE 98
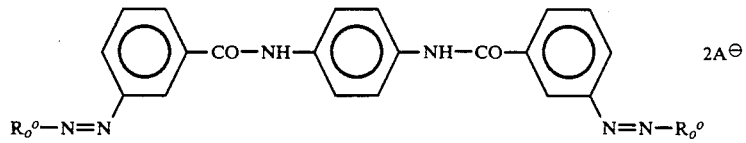
EXAMPLE 99
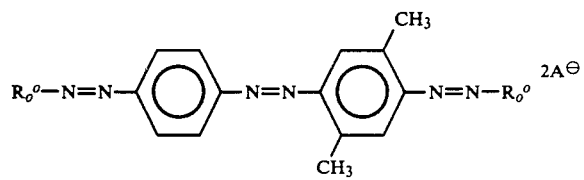
EXAMPLE 100
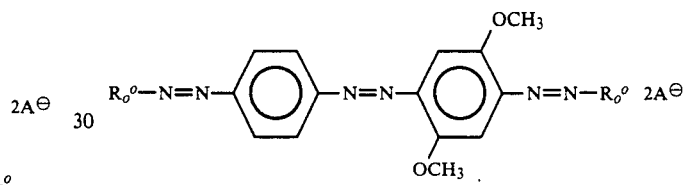
EXAMPLE 101
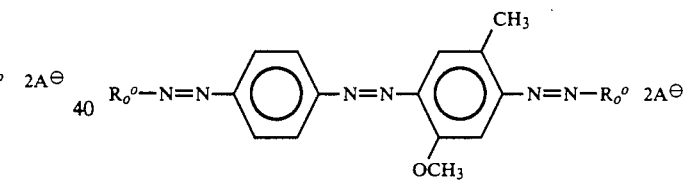
EXAMPLE 102
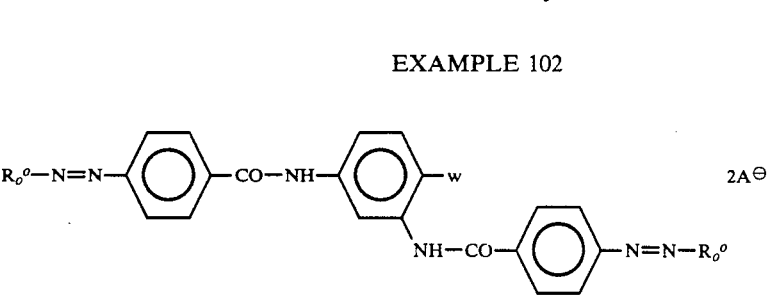
wherein
w signifies H, Cl, CH$_3$ or OCH$_3$;
EXAMPLE 103
wherein $R_o^o$ signifies a radical of the formula

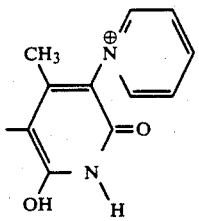

In table III is given the structure of further dyestuffs which may be produced in accordance with Example 1. They correspond to formula

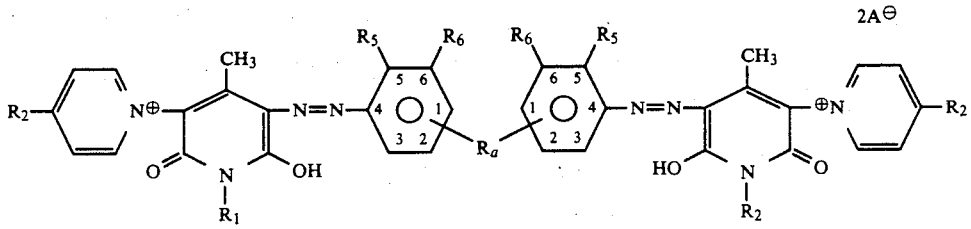

wherein $R_a$, $R_1$, $R_2$, $R_5$ and $R_6$ are as given in table III.

In the $R_a$ column is given the position of the bond with the adjacent aromatic rings.

The anion $R^\ominus$ may be any of those listed in the description.

| Ex. No. | $R_a$ | $R_1$ | $R_2$ | $R_5$ | $R_6$ |
|---|---|---|---|---|---|
| 104 | —CH$_2$-(1,1) | H | H | H | H |
| 105 | —CH$_2$—CH$_2$-(1,1) | H | H | H | H |
| 106 | —CH$_2$-(1,1) | H | H | CH$_3$ | H |
| 107 | direct bond | H | H | H | Cl |
| 108 | —CH$_2$-(1,1) | H | CH$_3$ | H | H |
| 109 | —CH$_2$—CH$_2$-(1,1) | H | CH$_3$ | H | H |
| 110 | —CH$_2$-(1,1) | C$_2$H$_5$ | H | H | H |
| 111 | " | CH$_3$ | H | H | H |
| 112 | —CH$_2$—CH$_2$-(1,1) | C$_2$H$_5$ | H | H | H |
| 113 | " | CH$_3$ | H | H | H |
| 114 | —HN—CO-(2,1) | H | H | H | H |
| 115 | —HN—CO-(2,2) | H | H | H | H |
| 116 | —CO—NH—⟨⟩—NH—CO-(1,1) | H | H | H | H |

The dyestuffs of Examples 9, 10, 14, 15, 17, 19, 21, 24–59, 71–96, 98, 102 and 103 dye paper in yellow shades; the dyestuffs of Examples 7, 11, 16, 22, 23, 60–70 and 97 dye paper in orange shades; the dyestuffs of Examples 6, 12, 18 dye paper in red shades; the dyestuffs of Examples 13, 20, 99–101 dye paper in violet shades and the dyestuff of Example 8 dyes paper in blue shades. The dyestuffs of Examples 104 to 116 dye polyacrylonitrile material or polyamide material which is modified by acid groups in yellow shades.

EXAMPLE 1g 14.9 Parts of 1,2-bis-(4'-aminobenzoylamino)-ethylene are dissolved at 0° in 100 parts of water and 31 parts of b 30% hydrochloric acid and are then tetrazotised with 6.9 parts of sodium nitrile by known methods. Subsequently, a solution consisting of 25 parts of 3-pyridinium-4-methyl-6-hydroxypyridone-2-chloride and 100 parts of water is added to the ice-cold diazo solution, and at the same time 15 parts of crystalline sodium acetate are sprinkled in in portions. After coupling, the reaction mixture is made acid with hydrochloric acid, whereby the dyestuff is precipitated. The dyestuff is filtered off. When dried and ground, a water-soluble powder is obtained, which dyes paper in yellow shades. The dyestuff corresponds to the formula

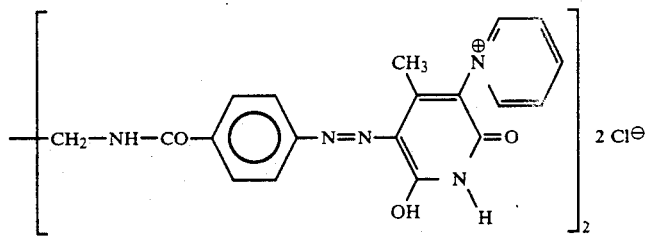

DYEING EXAMPLE Ag

70 Parts of chemically bleached sulphite cellulose (from conifer wood) and 30 parts of chemically bleached sulphite cellulose (from birchwood) are ground in 2000 parts of water in a Hollander. 0.2 Parts of the dyestuff described in Example 1q are sprinkled into this pulp. After mixing for 20 minutes, paper is produced from this pulp. The absorbent paper produced in this manner is dyed yellow. The waste water is practically colourless.

DYEING EXAMPLE Bg 0.5 Parts of the dyestuff of Example 1q are dissolved in 100 parts of hot water and cooled to room temperature. This solution is added to 100 parts of chemically bleached sulphite cellulose which has been ground with 2000 parts of water in a Hollander. After mixing thoroughly for 15 minutes, sizing takes place. Paper which is produced from this pulp has a yellow shade of average intensity, with good wet fastness.

DYEING EXAMPLE Cg

An absorbent strip of unsized paper is drawn through a dyestuff solution of the following composition at 40° to 50°:

0.5 parts of the dyestuff of Example 1q 0.5 parts of starch and
99.0 parts of water.

The excess dyestuff solution is squeezed out through two rollers. The dried paper strip is dyed yellow.

Equally good paper dyeings are obtained using the above Dyeing Examples Aq, Bq and Cq, by adding equivalent amounts as in Example a (liquid preparation) or Example b (granulate preparation).

EXAMPLE 2g

20 Parts of the dyestuff of Example 1q and 80 parts of dextrin are ground in a powder mill for 4 hours. The same dyestuff preparation may be formed by forming the components into a paste using 100 parts of water and finally spray drying.

One part of the obtained preparation is mixed with one part of 40% acetic acid, 200 parts of demineralised water are poured onto the paste and the whole hearted. Dilution takes place with 7000 parts of demineralised water, 2 parts of glacial acetic acid are added and, at 60°, 100 parts of a polyacrylonitrile material are added to the bath. The polyacrylonitrile material may be pretreated in a bath containing 8000 parts of water and 2 parts of acetic acid for 10–15 minutes at 60°.

The bath is raised in the course of 30 minutes to 98°–100°, boiled for 1½ hours at this temperature and then the substrate rinsed. A yellow dyeing with good light and wet fastness is obtained.

EXAMPLE 3q

20 Parts of the dyestuff of Example 1q are mixed with 80 parts of dextrin in a ball mill for 48 hours. One part of the obtained preparation and 1 part of 40% acetic acid are intimately mixed. 200 Parts of demineralised water are poured on and the whole heated. With this stock solution dyeing is carried out as follows:

a) The solution is diluted with 7000 parts of demineralised water, then 21 parts of calcined sodium sulphate, 14 parts formic acid and 15 parts of a carrier based on the reaction product of ethylene oxide with dichlorophenols are added and, at 60°, 100 parts of acid modified polyester material are entered into the bath. The polyester material may be pretreated in a bath containing 8000 parts of water and 2 parts of acetic acid for 10–15 minutes at 60°.

The bath is raised over the course of 30 minutes to 98°–100°, boiled at this temperature for one hour and then the substrate removed and rinsed. A level yellow dyeing with good light and wet fastness is obtained.

b) The solution is diluted with 3000 parts of demineralised water after which 18 parts of calcined sodium sulphate and 6 parts each of ammonium sulphate and formic acid are added and, at 60°, 100 parts of acid modified polyester material are entered into the bath. The bath is raised to 110° over the course of 45 minutes in a closed vessel. This temperature is held for one hour with agitation of the bath. The bath is then cooled to 60° over the course of 25 minutes and the dyed material rinsed. A level fast yellow dyeing with good wet fastness is obtained.

EXAMPLE 4g

20 Parts of the dyestuff of Example 1q and 80 parts of dextrin are mixed in a ball mill for 48 hours. One part of the obtained preparation and 1 part of 40% acetic acid are intimately mixed, whereafter 200 parts of demineralised water are poured on and the whole heated.

The solution is diluted with 7000 parts of demineralised water, 14 parts of formic acid and 15 parts of a carrier based on the reaction product of ethylene oxide and dichlorophenols are added. The liquor is adjusted to pH 6 with an acid buffer solution. At 25° 100 parts of acid modified polyamide material are entered into the bath at a liquor ratio of 1:80. The bath is heated to 98° over the course of 45 minutes and boiled for one hour at this temperature. The substrate is then removed and rinsed under running water at 70°–80° and finally under cold water. The material may then be spin dried and finally ironed. A yellow dyeing with good fastness is obtained.

EXAMPLE 5g

A printing paste is prepared as follows:

One part of the dyestuff of Example 1q and 30 parts of acetic acid are intimately mixed and 280 parts of boiling water poured on. To this solution are added 50 parts of benzyl alcohol and 500 parts of a thickener based on carboxymethyl cellulose, which swells to a ratio of 1:4 in water, and 10 parts of a swelling agent.

Using this printing paste, a polyacrylonitrile, polyester or polyamide material which has been acid modified may be printed according to known methods.

The prints are dried and then placed in an autoclave where they are steamed for 30 minutes at 110° under 1.8 atmospheres (one can also steam continuously for 5 to 30 minutes).

After rinsing with cold water, unfixed dyestuff may be removed by washing for 5 minutes at 70° with a 0.1% soap solution (detergent). Finally the prints are rinsed with cold water and dried by known methods. A fast level print with good fastness is obtained.

According to the procedure of Example 4q, advantageous dyeings are obtained on differential dyeing polyamide material of the types 844, 845 and 847 (Du Pont).

In the following table further dyes are given which can be produced according to the procedure of Example 1q. These dyes can be used in the same way as that of Example 1q and correspond to the formula

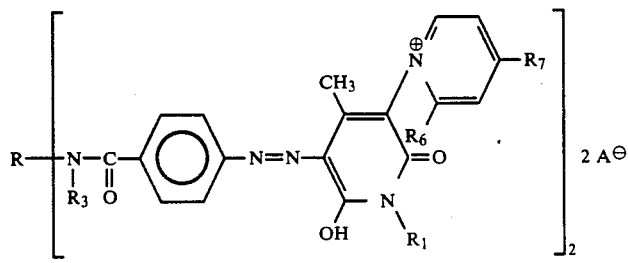

wherein R, $R_1$, $R_3$, $R_6$ and $R_7$ have the meanings given in the table.

The anion A⊖ may be any one mentioned in the foregoing description.

| Example No. | R | $R_1$ | $R_3$ | $R_6$ | $R_7$ |
|---|---|---|---|---|---|
| 6q | —CH$_2$—CH$_2$— | H | H | CH$_3$ | H |
| 7q | " | H | H | H | CH$_3$ |
| 8q | " | H | CH$_3$ | H | H |
| 9q | " | CH$_2$—CH$_2$—OH | H | H | H |
| 10q | " | " | H | CH$_3$ | H |
| 11q | " | " | H | H | CH$_3$ |
| 12q | " | " | CH$_3$ | H | H |
| 13q | " | CH$_3$ | H | H | H |
| 14q | " | " | H | CH$_3$ | H |
| 15q | " | " | H | H | CH$_3$ |
| 16q | " | " | CH$_3$ | H | H |
| 17q | " | N(CH$_3$)$_2$ | H | H | H |
| 18q | " | " | H | CH$_3$ | H |
| 19q | " | " | CH$_3$ | H | H |
| 20q | " | CH$_2$—CHOH—CH$_3$ | H | H | H |
| 21q | " | CH$_3$—CH—CH$_2$OH | H | H | H |

EXAMPLE 22g

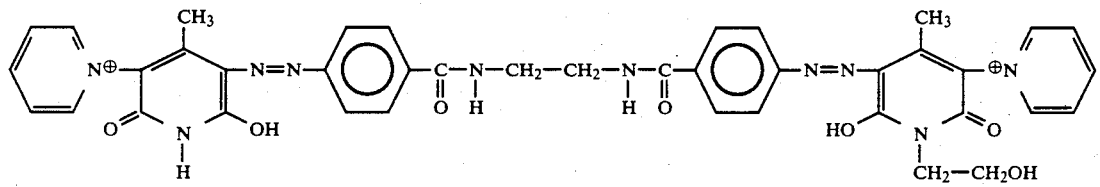

2 Cl⊖

The dyestuffs of Examples 6q–22q dye paper, polyacrylonitrile and acid modified polyamide materials in yellow shades.

What is claimed is:
1. A compound of the formula

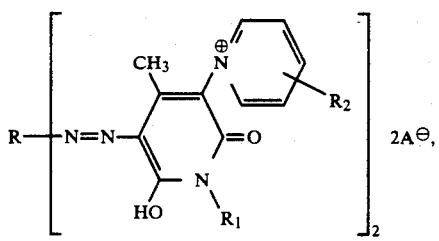

wherein
R is 2,7-fluoroenylene,

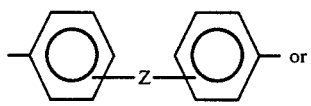 or

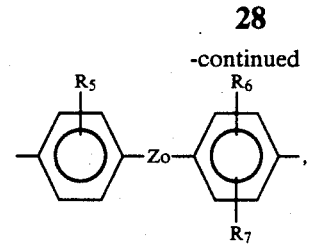

-continued wherein
Z is a direct bond, straight or branched C$_{1-6}$alkylene, —CO—, —NHCSNH—, —S—, —O—, —CH=CH—, —S—S—, —SO$_2$—, —NH—, —NH—CO—, —NCH$_3$—CO—,

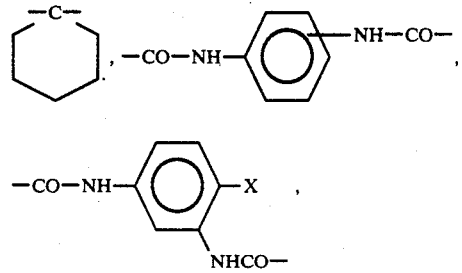

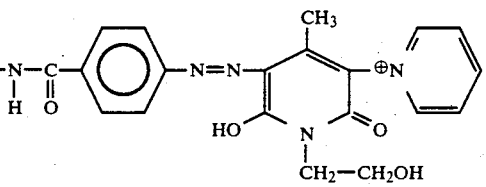

—XO$_2$NH—,

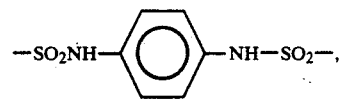

—NR$_8$—CO—(CH$_2$)$_n$—CO—NR$_8$—, —NR$_8$—CO—CH=CH—CO—NR$_8$—, —NR$_8$—CO—NR$_8$—, —CO—NH—NH—CO—, —CH$_2$—CO—NH—NH—CO—CH$_2$—, —CH=CH—CO—NH—NH—CO—CH=CH—,

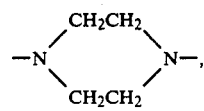

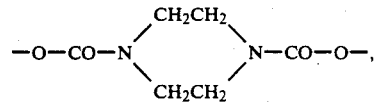

-continued

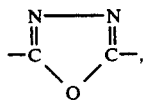

—O—CO—O—, —CO—O—, —CO—CO—,
—O—(CH$_2$)$_n$—O—,

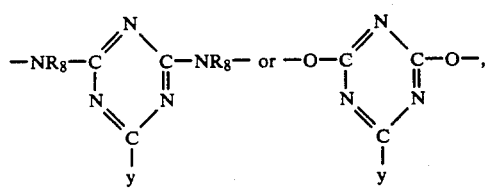

wherein
each R$_8$ is independently hydrogen or C$_{1-4}$alkyl,
x is halo, C$_{1-4}$alkyl or C$_{1-4}$alkoxy,
y is halo, —NHCH$_2$CH$_2$OH or —N(CH$_2$CH$_2$OH)$_2$, and
n is 1, 2, 3 or 4, with the proviso that Z is meta or para to each —N=N— linkage,
Z$_o$ is a direct bond, —N=N—, —CH$_2$— or —CH$_2$CH$_2$—,
R$_5$ is hydrogen, halo, C$_{1-4}$alkyl or C$_{1-4}$alkoxy,
R$_6$ is halo, C$_{1-4}$alkyl or C$_{1-4}$alkoxy, and
R$_7$ is hydrogen, C$_{1-4}$alkyl or C$_{1-4}$alkoxy,
each R$_1$ is independently hydrogen, C$_{1-4}$alkyl, C$_{2-4}$hydroxyalkyl the hydroxy group of which is in other than the 1-position or —NR$_3$R$_4$, wherein each of R$_3$ and R$_4$ is independently n-C$_{1-4}$alkyl,
each R$_2$ is independently hydrogen, n-C$_{1-4}$alkyl, n-C$_{1-4}$-hydroxyalkyl or C$_{1-4}$alkoxy, and
each A$^\ominus$ is an anion,
wherein each halo is independently fluoro, chloro or bromo.

2. A compound according to claim 1 wherein each A$^\ominus$ is a non-chromophoric anion.

3. A compound according to claim 1 wherein
the two R$_1$'s are identical, and
the two R$_2$'s are identical and are in the identical positions of the pyridinium rings.

4. A compound according to claim 1 wherein R is 2,7-fluorenylene.

5. A compound according to claim 1 wherein R is

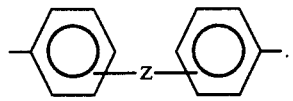

6. A compound according to claim 5 wherein
Z is a direct bond, straight or branched C$_{1-6}$-alkylene, —CO—, —NHCSNH—, —S—, —O—, —CH=CH—, —S—S—, —SO$_2$—, —NH—, —NH—CO—, —NCH$_3$—CO—,

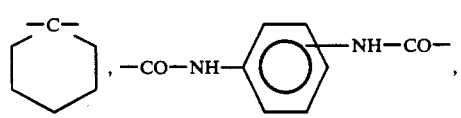

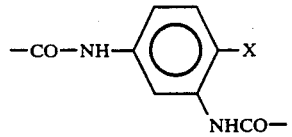

—SO$_2$NH—,

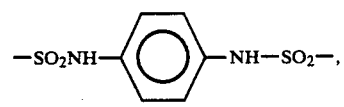

—NR$_8$—CO—(CH$_2$)$_n$—CO—NR$_8$—, —NR$_8$—CO—CH=CH—CO—NR$_8$—, —NR$_8$—CO—NR$_8$—, —CO—NH—NH—CO—, —CH$_2$—CO—NH—NH—CO—CH$_2$—, —CH=CH—CO—NH—NH—CO—CH=CH—, —O—CO—O—, —CO—O—, —CO—CO— or —O—(CH$_2$)$_n$—O—.

7. A compound according to claim 6 having the formula

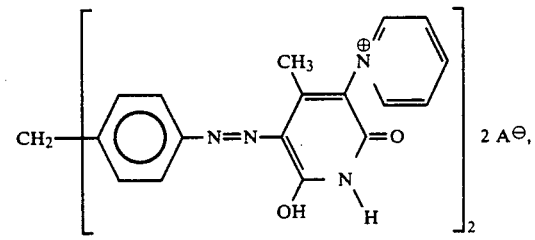

wherein each A$^\ominus$ is an anion.

8. The compound according to claim 7 wherein each A$^\ominus$ is chloride.

9. A compound according to claim 5 wherein Z is

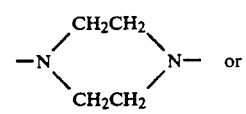 or

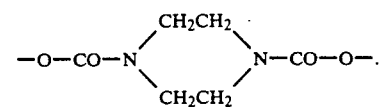

10. A compound according to claim 5 wherein Z is

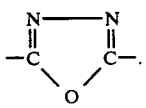

11. A compound according to claim 5 wherein Z is

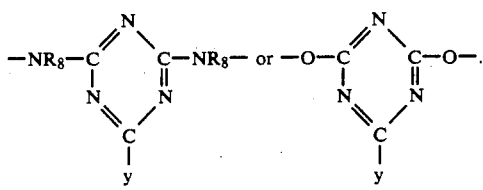

12. A compound according to claim 1 wherein R is

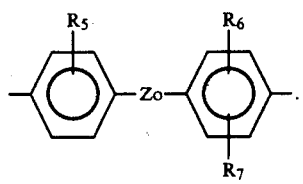

13. A compound according to claim 12 wherein Zo is a direct bond, —CH$_2$— or —CH$_2$CH$_2$—.

14. A compound according to claim 12 wherein Zo is —N=N—.

15. A compound according to claim 1 having the formula

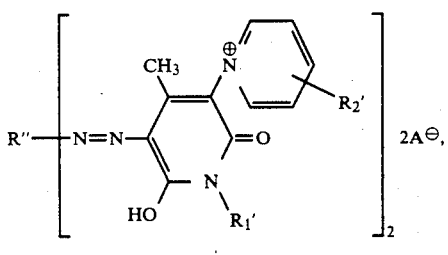

wherein
R'' is

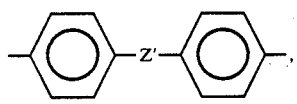

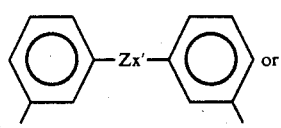

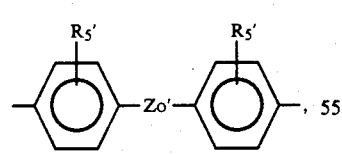

wherein
Z' is —S—, —O—, —CH=CH—, —NH—, —NH—CO—,

—SO$_2$NH—,

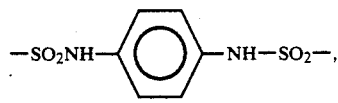

—CO—NH—NH—CO—, —CH$_2$—CO—NH—NH—CO—CH$_2$—, —CH=CH—CO—NH—NH—CO—CH=CH—,

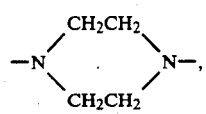

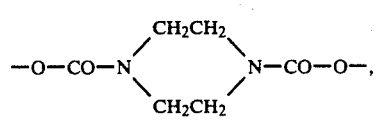

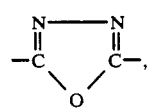

—O—CO—O—, —CO—O—, —CO—CO—, —CH$_2$CH$_2$—, —NH—CO—NH—,

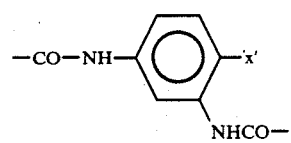

—NH—CO—CH$_2$CH$_2$—CO—NH—, —NH—CO—(CH$_2$)$_4$—CO—NH—, —NH—CO—CH=CH—CO—NH—, —NCH$_3$—CO—CH$_2$CH$_2$—CO—NCH$_3$—, —NCH$_3$—CO—CH=CH—CO—NCH$_3$—, —NCH$_3$—CO—NCH$_3$—, —O—CH$_2$CH$_2$—O—,

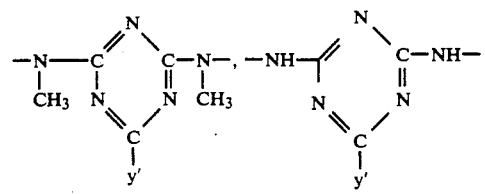

or 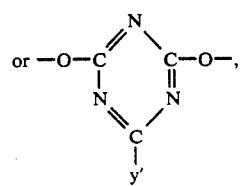

wherein
x' is hydrogen, chloro, methyl or methoxy, and
y' is chloro, —NH—CH$_2$CH$_2$OH or —N(CH$_2$CH$_2$OH)$_2$, Zx' is —NH—CO—,

—NH—CO—CH$_2$CH$_2$—CO—NH— or —NH-CO—CH=CH—CO—NH—,

Zo' is a direct bond, —CH$_2$— or —CH$_2$CH$_2$— and each R$_5$' is chloro, methyl or methoxy, with the proviso that the two R$_5$''s are identical, each R$_1$' is independently hydrogen, methyl, ethyl, 2-hydroxyethyl, 2-hydroxypropyl, 2-hydroxy-1-methylethyl or dimethylamino, each R$_2$' is independently hydrogen, methyl, methoxy or 2-hydroxyethyl, and each A$^\ominus$ is an anion.

16. A compound according to claim 15 wherein the two R$_1$''s are identical, and the two R$_2$''s are identical and are in the identical positions of the pyridinium rings.

17. A compound according to claim 15 wherein each R$_1$' is independently hydrogen or methyl, and each R$_2$' is independently hydrogen or methyl.

18. A compound according to claim 15 wherein R'' is

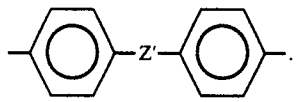

19. A compound according to claim 18 wherein Z' is —S—, —O—, —CH=CH—, —NH—, —NH—CO—,

—SO$_2$NH—,

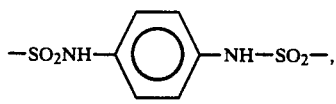

—CO—NH—NH—CO—, —CH$_2$—CO—NH—NH—CO—CH$_2$—, —CH=CH—CO—NH—NH—FCO—CH=CH—, —O—CO—O—, —CO—O—, —CO—CO—, —CH$_2$CH$_2$—, —NH—CO—NH—,

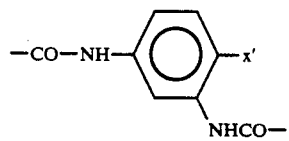

—NH—CO—CH$_2$CH$_2$—CO—NH—, —NH-CO—CH=CH—CO—NH—, —NH—CO—(CH$_2$)$_4$—CO—NH—, —NCH$_3$—CO—CH$_2$—CO—NCH$_3$—, —NCH$_3$—CO—CH=CH—CO—NCH$_3$—, —NCH$_3$—CO—NCH$_3$— or —O—CH$_2$CH$_2$—O—.

20. A compound according to claim 18 wherein Z' is

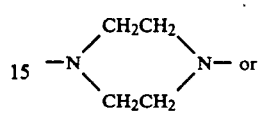

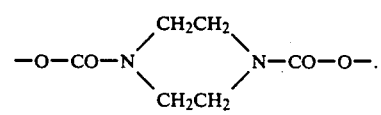

21. A compound according to claim 18 wherein Z' is

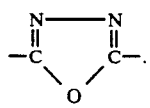

22. A compound according to claim 18 wherein Z' is

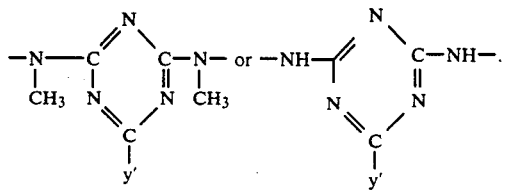

23. A compound according to claim 15 wherein R'' is

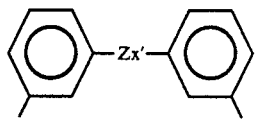

24. A compound according to claim 15 wherein R'' is

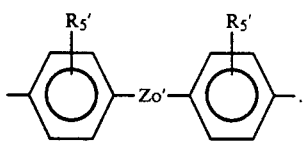

25. A compound according to claim 15 having the formula

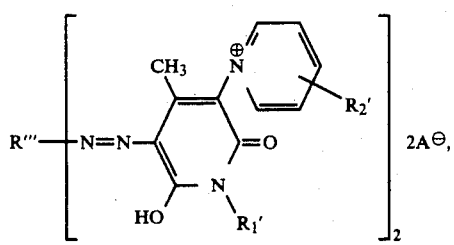

wherein
R''' is

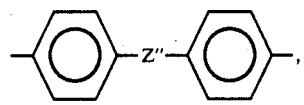

wherein
Z'' is —NH—CO—,

—CH$_2$—CO—NH—NH—CO—CH$_2$—,

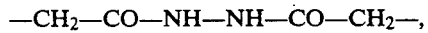

—CH$_2$CH$_2$—,

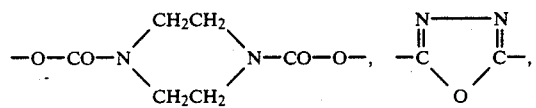

—NH—CO—CH$_2$CH$_2$—CO—NH—, —NH-CO—CH=CH—CO—NH—, —NH—CO—(CH$_2$)$_4$—CO—NH—, —NCH$_3$—CO—CH$_2$CH$_2$—CO—NCH$_3$—, —NCH$_3$—CO—CH=CH—CO—NCH$_3$— or

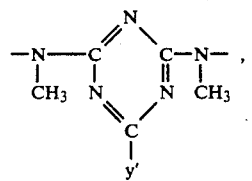

each R$_1'$ is independently hydrogen, methyl, ethyl, 2-hydroxyethyl, 2-hydroxypropyl, 2-hydroxy-1-methylethyl or dimethylamino,
each R$_2'$ is independently hydrogen, methyl, methoxy or 2-hydroxyethyl, and
each A$^\ominus$ is an anion.

26. A compound according to claim 25 wherein the two R$_1''$s are identical, and the two R$_2''$s are identical and are in the identical positions of the pyridinium rings.

27. A compound according to claim 25 wherein each R$_1'$ is independently hydrogen or methyl, and each R$_2'$ is independently hydrogen or methyl.

28. A compound according to claim 25 wherein Z'' is —NH—CO—,

—CH$_2$—CO—NH—NH—CO—CH$_2$—, —CH$_2$CH$_2$—,

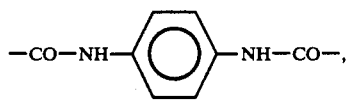

—NH—CO—CH$_2$CH$_2$—CO—NH—, —NH-CO—CH=CH—CO—NH—, —NH—CO—(CH$_2$)$_4$—CO—NH—, —NCH$_3$—CO—CH$_2$—CO—NCH$_3$— or —NCH$_3$—CO—CH=CH—CO—NCH$_3$—.

29. A compound according to claim 25 wherein Z'' is

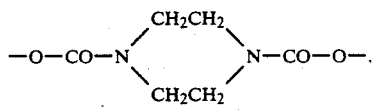

30. A compound according to claim 25 wherein Z'' is

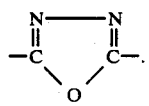

31. A compound according to claim 25 wherein Z'' is

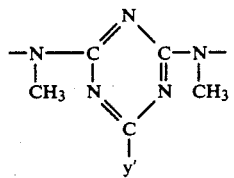

32. A compound according to claim 25 having the formula

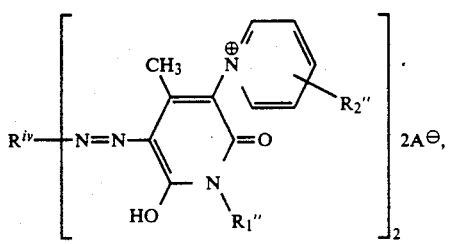

wherein
R$^{iv}$ is

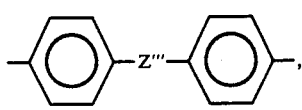

wherein
Z''' is —NH—CO—,

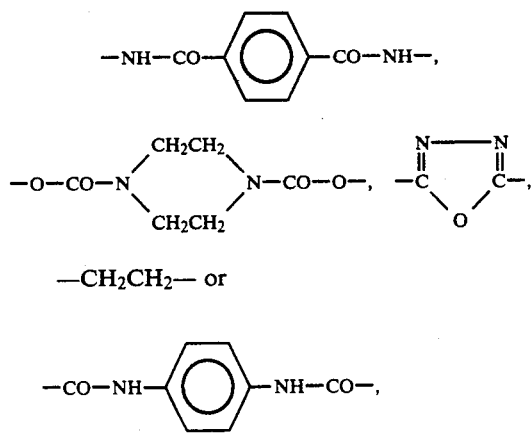

—CH₂CH₂— or

each $R_1''$ and $R_2''$ is independently hydrogen or methyl, and
each $A^\ominus$ is an anion.

33. A compound according to claim 32 wherein
the two $R_1'''$'s are identical, and
the two $R_2'''$'s are identical and are in the identical positions of the pyridinium rings.

34. A compound according to claim 32 wherein Z''' is —NH—CO—,

—CH₂CH₂— or

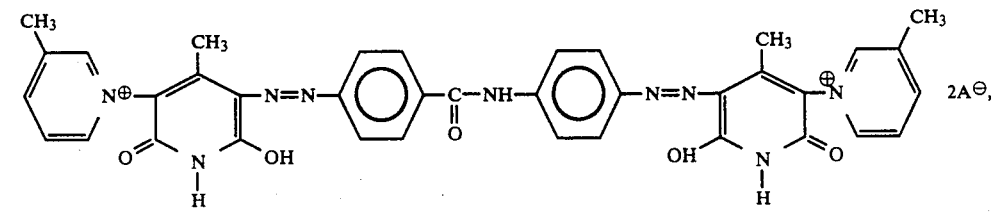

35. A compound according to claim 34 having the formula wherein each $A^\ominus$ is an anion.

36. A compound according to claim 32 wherein Z''' is

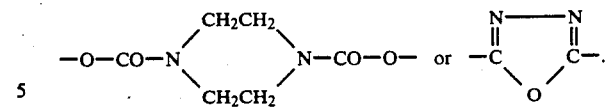

37. A compound according to claim 15 having the formula

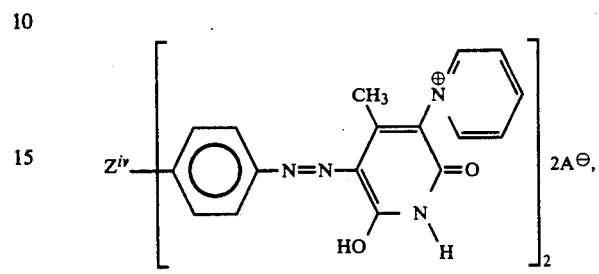

wherein
$Z^{iv}$ is —CH₂CH₂—, —NH—CO—NH—, —NH—CO—CH=CH—CO—NH—,

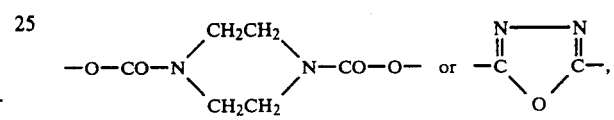

and
each $A^\ominus$ is an anion.

38. A compound according to claim 37 having the formula

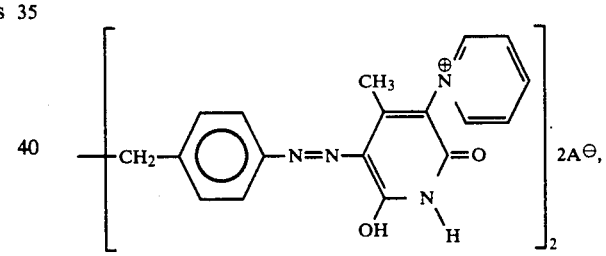

wherein each $A^\ominus$ is an anion.

39. The compound according to claim 38 wherein each $A^\ominus$ is chloride.

40. A compound according to claim 37 having the formula

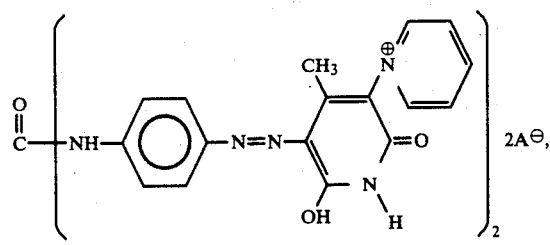

wherein each A⊖ is an anion.

41. A compound according to claim 37 having the formula

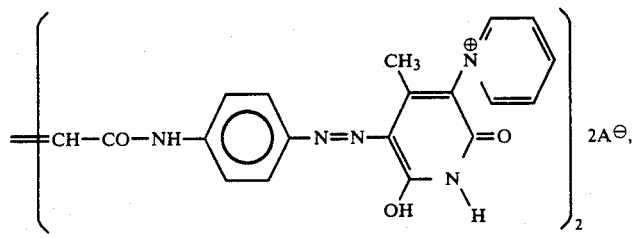

wherein each A⊖ is an anion.

42. A liquid dye composition comprising a solution of a compound according to claim 1.

43. A granulated dye composition comprising a compound according to claim 1.

44. A process for the production of dyed paper comprising applying to paper or incorporating into paper pulp and forming paper from said paper pulp a compound according to claim 1.

45. A compound of the formula

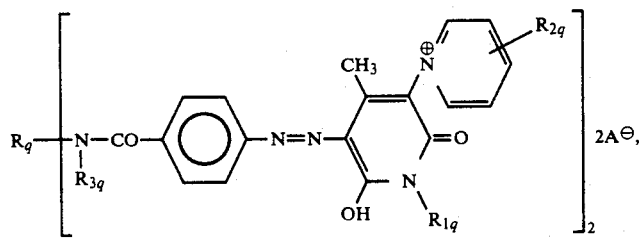

wherein
$R_q$ is straight chain $C_{2-4}$alkylene,
each $R_{1q}$ is independently hydrogen, $C_{1-4}$alkyl, $C_{2-4}$hydroxyalkyl the hydroxy group of which is in other than the 1-position or $-NR_{4q}R_{5q}$, wherein each of $R_{4q}$ and $R_{5q}$ is independently n-$C_{1-4}$alkyl,
each $R_{2q}$ is independently hydrogen, n-$C_{1-4}$alkyl, n-$C_{1-4}$-hydroxyalkyl or $C_{1-4}$alkoxy,
each $R_{3q}$ is independently hydrogen or $C_{1-4}$alkyl, and
each A⊖ is a non-chromophoric anion.

46. A compound according to claim 45 wherein $R_q$ is 1,2-ethylene.

47. A compound according to claim 46 wherein
each $R_{1q}$ is hydrogen, methyl, ethyl, 2-hydroxyethyl, 2-hydroxypropyl, 2-hydroxy-1-methylethyl or dimethylamino, with the proviso that the two $R_{1q}$'s are identical,
each $R_{2q}$ is hydrogen, methyl, methoxy or 2-hydroxyethyl, with the proviso that the two $R_{2q}$'s are identical and are in the identical positions of the pyridinium rings, and
each $R_{3q}$ is hydrogen, methyl or ethyl, with the proviso that the two $R_{3q}$'s are identical.

48. A compound according to claim 47 wherein
each $R_{1q}$ is hydrogen or methyl, with the proviso that the two $R_{1q}$'s are identical, and
each $R_{2q}$ is hydrogen or methyl, with the proviso that the two $R_{2q}$'s are identical and are in the identical positions of the pyridinium rings.

49. A compound according to claim 48 wherein
each $R_{1q}$ is hydrogen, and
each $R_{2q}$ is hydrogen.

50. A compound according to claim 49 wherein each $R_{3q}$ is hydrogen.

51. The compound according to claim 50 having the formula

52. The compound according to claim 46 having the formula

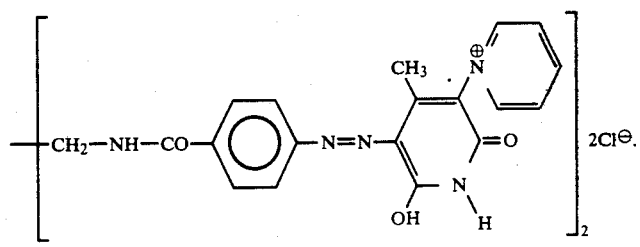

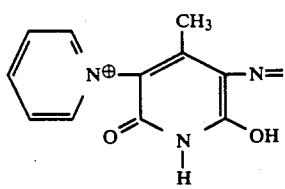 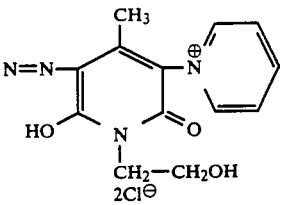

53. A liquid dye composition comprising a solution of a compound according to claim 45.

54. A granulated dye composition comprising a compound according to claim 45.

55. A process for the production of dyed paper comprising applying to paper or incorporating into paper pulp and forming paper from said paper pulp a compound according to claim 45.

56. A process for dyeing or printing a textile substrate dyeable with basic dyes comprising applying to a textile substrate dyeable with basic dyes, as a dyeing or printing agent, a compound according to claim 45.

* * * * *